(12) United States Patent
Ishikawa et al.

(10) Patent No.: US 9,643,089 B2
(45) Date of Patent: May 9, 2017

(54) GAME SYSTEM

(71) Applicant: HONDA MOTOR CO., LTD., Tokyo (JP)

(72) Inventors: Ikki Ishikawa, Tokyo (JP); Yuichiro Ishido, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 266 days.

(21) Appl. No.: 14/224,653

(22) Filed: Mar. 25, 2014

(65) Prior Publication Data

US 2014/0295963 A1 Oct. 2, 2014

(30) Foreign Application Priority Data

Mar. 26, 2013 (JP) .................................. 2013-063307

(51) Int. Cl.
*A63F 9/24* (2006.01)
*A63F 13/65* (2014.01)
*A63F 13/216* (2014.01)

(52) U.S. Cl.
CPC ............ *A63F 13/65* (2014.09); *A63F 13/216* (2014.09)

(58) Field of Classification Search
CPC ............................... A63F 13/65; A63F 13/216
USPC .................... 463/1–6, 30–33, 40–47
See application file for complete search history.

(56) References Cited

U.S. PATENT DOCUMENTS

| 2012/0052953 | A1* | 3/2012 | Annambhotla | A63F 13/10 463/40 |
| 2012/0264518 | A1* | 10/2012 | Rouille | A63F 13/12 463/39 |
| 2014/0195272 | A1* | 7/2014 | Sadiq | G06Q 40/08 705/4 |

FOREIGN PATENT DOCUMENTS

| JP | 2002-233663 | 8/2002 |
| JP | 2012-215446 | 11/2012 |

OTHER PUBLICATIONS

"GPS-based ToyToyota app lets kids 'drive' from the backseat" by Pawel Piejko posted Jul. 19, 2011 at http://www.gizmag.com/backseat-driver-toytoyota-app/19260/.*
Japanese Office Action dated Mar. 10, 2015, 1 page.
English Translation of JP 2002-233663, 31 pages.

* cited by examiner

*Primary Examiner* — David L Lewis
*Assistant Examiner* — Ross Williams
(74) *Attorney, Agent, or Firm* — Rankin, Hill & Clark LLP

(57) ABSTRACT

The advancing of a game is made possible using the travel in the real world of a vehicle such as an automobile, as well as advancement of the game without entirely wasting travel of the vehicle. A game system (50) includes a probe device (21) that collects and transmits travel data of a vehicle and a game device (1), in which the game device (1) is provided with an travel data acquisition unit (31) that acquires travel data from the prove device (21), a distance calculation unit (33) that calculates a travel distance in virtual space based on the travel data thus acquired, and a display control unit (34) that displays a sight-seeing area unique image to a user when travelling on a route in virtual space according to the travel (Continued)

distance thus calculated, and as a results of this travel, reaching a set sight-seeing area.

8 Claims, 8 Drawing Sheets

(1) USER DATA DB 41

| USER | TRAVEL DATA | | | GAME DATA | | |
|---|---|---|---|---|---|---|
| | TOTAL TRAVEL DISTANCE | PRESENT TRAVEL DISTANCE | ... | SELECT ROUTE | CURRENT POSITION | ... |
| USER A | 300km | 80km | ... | KANTO | NERIMA | ... |
| USER B | 200km | 60km | ... | HOKKAIDO | HAKODATE | ... |
| USER C | 400km | 30km | ... | TOHOKU | SENDAI | ... |
| ... | ... | ... | ... | ... | ... | ... |

(2) GAME DATA DB 42

| | GAME DATA | | | | | | |
|---|---|---|---|---|---|---|---|
| ROUTE | STOPPING POINT | ACHIEVEMENT CARD | REQUIRED DISTANCE | STOPPING POINT | ACHIEVEMENT CARD | REQUIRED DISTANCE | ... |
| KANTO | KASAI | — | START | NERIMA | RADISH | ... | ... |
| ... | ... | ... | ... | ... | ... | ... | ... |

FIG. 3

USER INFORMATION UPDATE PROCESSING

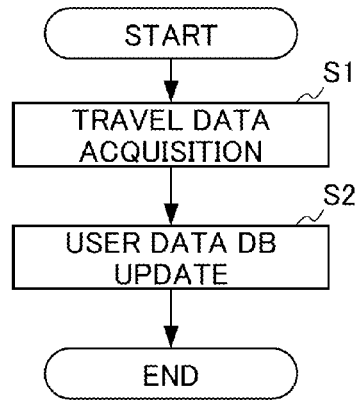

FIG. 4

GAME SYSTEM

This application is based on and claims the benefit of priority from Japanese Patent Application No. 2013-063307, filed on 26 Mar. 2013, the content of which is incorporated herein by reference.

BACKGROUND OF THE INVENTION

Field of the Invention

The present invention relates to a game system, and in detail, relates to a game system that use the travel in the real world of a vehicle such as an automobile in the advancement of a game.

Related Art

It is common for games thus far known to be completed in virtual space; however, in recent years, games that reflect the movement of a user in the real world within a virtual space have also been attempted. For example, by promoting a character according to the number of steps made by a user, a pedometer with a game function that allows a game-like element to be provided to tedious walking exercise, and gives motivation to continue exercise has been known.

However, such a pedometer is a so-called standalone-type game, and further motivation has been difficult once clearing the entire game. In addition, since the measured value of a pedometer possessed by the user is used to advance the game, for example, it has been possible to advance the game by simply shaking by hand, or the like. Furthermore, assuming that a user advances the game by walking, it has not been possible for an automobile user that usually does not have much chance to walk to enjoy.

Therefore, games that can be enjoyed by automobile users have also been attempted and, for example, Patent Document 1 discloses a navigation device that provides a game function to a car navigation device, and realizes route guidance achieving both practicality and amusement by linking together the route guidance and game (for example, Patent Document 1).

[Patent Document 1] Japanese Unexamined Patent Application, Publication No. 2012-215446

SUMMARY OF THE INVENTION

Although an automobile user can be amused by the navigation device of Patent Document 1, since the game is only implemented during route guidance up to the destination, further improvement has been demanded. In other words, an automobile user uses the automobile within a geographical range known to oneself usually, and seldom receives route guidance in routine use of the automobile; therefore, there has been concern over most of the travel time being time unrelated to the game, and the motivation for game play fading.

The present invention has been made taking consideration of such problems, and has an object of providing a game system that advance a game using the travel in the real world of a vehicle such as an automobile, as well as enabling advancement of the game without entirely wasting travel of the vehicle.

According to a first aspect of the invention, a game system (e.g., the game system 50, 50A described later) includes: a probe device (e.g., the probe device 21, car navigation device, acceleration sensor, etc. described later) that collects and transmits travel data (e.g., the travel distance, flag of sudden braking, vehicle speed, etc. described later) from a vehicle (e.g., the vehicle such as an automobile described later); and a game device (e.g., the game device 1, game server 11, user terminal 12 described later) that is communicably connected with the probe device, in which the game device includes: a travel data acquisition unit (e.g., the travel data acquisition unit 31 described later) that acquires the travel data from the probe device; a distance calculation unit (e.g., the distance calculation unit 33 described later) that calculates a travel distance in virtual space based on the travel data thus acquired; and a display control unit (e.g., the display control unit 34 described later) that displays sight-seeing area information (e.g., the achievement card described later) set to a user according to the travel distance thus calculated.

With the game system of the first aspect, when the distance calculation unit of the game device calculates the travel distance in virtual space from the travel data of the user in the real world collected by the probe device, the display control unit displays sight-seeing area information according to the travel distance in virtual space to the user.

It is thereby possible to provide a game in which elements of the real world are introduced to the user of a vehicle such as an automobile. In particular, since it is made a configuration that uses the travel data in the real world, irrespective of the presence of route guidance, it is possible to make the game advance using all of the vehicle travel time, and it is possible to fascinate an automobile user without entirely wasting travel of the vehicle.

According to a second aspect of the invention, in the game system as described in the first aspect, the game device further includes a route setting unit (e.g., the route setting unit 32 described later) that sets a route in virtual space travelled based on the travel distance, in which the sight-seeing area information is an image unique to a sight-seeing area (e.g., the achievement card described later) existing on the route thus set, and the display control unit displays a composite image (e.g., the composite image 300 shown in FIG. 9 described later) produced by combining the image unique to the sight-seeing area and an image set by the user to the user.

According to the game system of the second embodiment, when the game advances by the user travelling in a vehicle, a composite image produced by combining a sight-seeing area unique image and an image of the user is displayed; therefore, the user can have a feeling of making a realistic trip accompanying advancement of the game.

According to a third aspect of the invention, the game device as described in the second aspect further includes a contribution accepting unit (e.g., the contribution accepting unit 35A described later) that accepts a contribution of the image unique to the sight-seeing area from a user.

According to the game system of the third aspect, not only is a sight-seeing area unique image prepared on a game provider side in advance, but also sight-seeing area unique images contributed by other players can be displayed to the user; therefore, it is possible to establish sight-seeing area images displayed to the user rich in variation.

According to the present invention, it is possible to advance a game using the travel in the real world of a vehicle such as an automobile, as well as causing the game to advance without entirely wasting travel of the vehicle.

BRIEF DESCRIPTION OF THE DRAWINGS

FIG. 3 provides tables showing the configuration of a user data DB;

FIG. 4 is a flowchart showing the flow of processing of the game system;

DETAILED DESCRIPTION OF THE INVENTION

First Embodiment

Hereinafter, a preferred embodiment of a game system of the present invention will be explained while referencing the drawings. First, a game system 50 of the first embodiment will be explained while referencing FIGS. 1 to 9.
(Functional Configuration of Game System 50)

Figure 1:
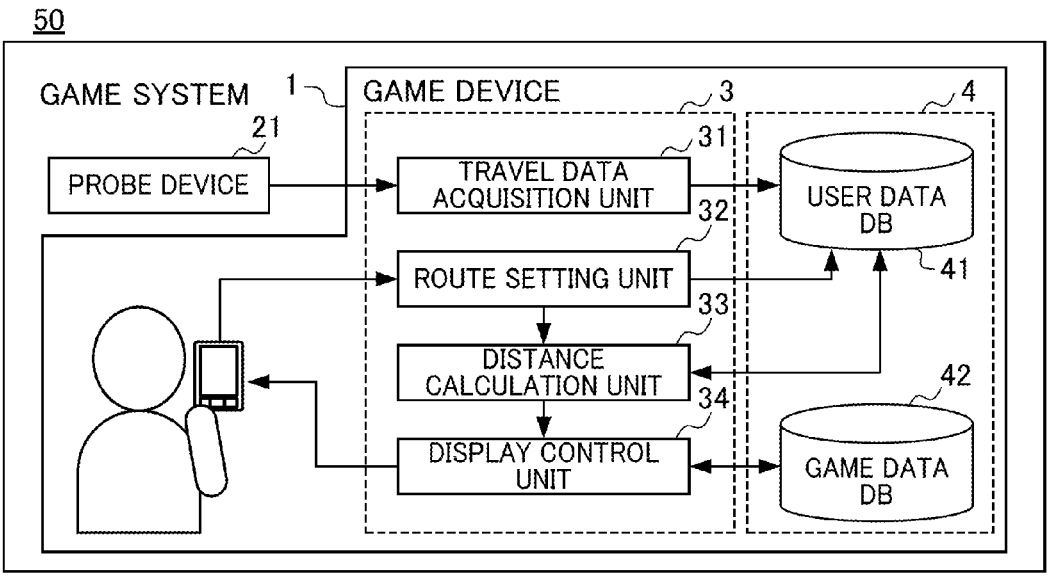
FIG. 1 is a block diagram showing the functional configuration of a game system according to a first embodiment.

The functional configuration of the game system 50 of the present invention will be explained while referencing FIG. 1. FIG. 1 is a functional block diagram showing the functional configuration of the game system 50.

The game system 50 is configured to include a probe device 21 and a game device 1.

The probe device 21 is connected to be wirelessly communicable with the game device 1, collects travel data of a vehicle such as an automobile (vehicle), and transmits the collected travel data to the game device 1. It should be noted that the travel data includes at least the travel distance of the vehicle, and may include other data such as the travel speed (vehicle speed), traveled route, flag indicator of sudden braking, and type of vehicle, as necessary. In addition, the transmission of travel data to the game device 1 may be a configuration directly transmitting from the probe device 21 to the game device 1, and may be a configuration indirectly transmitting from the probe device 21 via a navigation server 22 described later.

The game device 1 executes a game in response to travel data in the real world of the vehicle, and in the present embodiment, executes a game to move (travel) in a virtual space in response to the travel distance of the vehicle. This game device 1 is configured to include a control unit 3 and a storage unit 4.

The control unit 3 functions as a travel data acquisition unit 31, route setting unit 32, distance calculation unit 33 and display control unit 34, in accordance with a predetermined game program. In addition, the storage unit 4 includes a user data DB 41 and game data DB 42.

The travel data acquisition unit 31 acquires travel data transmitted from the probe device 21, and stores in the user data DB 41 to be associated with each user.

The route setting unit 32 sets the route in virtual space in response to an indication from the user, i.e. a route to be traveled by the user in the game, and stores in the user data DB 41 to be associated with each user.

Herein, the user data DB 41 will be explained while referencing FIG. 3. The user data DB 41 stores the travel data and game data for every user.

The travel data at least includes the total travel distance in the real world of the vehicle, and the present travel distance. It should be noted that present travel distance is a distance for which the vehicle traveled in the real world since the end time of a previous game, and travels a route in virtual space based on this present travel distance during subsequent game execution. In addition, other data such as a flag of sudden braking, and the type of vehicle may be included in the travel data.

The game data is setting information of every user, and at least includes the route set by the user, and current position of the user on the route.

Referring back to FIG. 1, the distance calculation unit 33 calculates the travel distance in virtual space based on the travel data acquired from the probe device 21. More specifically, the distance calculation unit 33 calculates the present travel distance stored in the user data DB 41 as the travel distance in virtual space. It should be noted that the distance calculation unit 33 may calculate the travel distance in virtual space relative to the present travel distance in a 1:1 relationship, and may calculate with a predetermined weighting.

The predetermined weighting may be performed arbitrarily, and as one example, weighting may be performed based on the relationship between the type of vehicle in the real world and the route in virtual space. In other words, in the case of the type of vehicle of the user not being suited to the set route, predetermined weighting may be performed. More specifically, in the case of a very long route such as movement between stars being set, the distance calculation unit 33 calculates a value arrived at by multiplying the travel distance of the vehicle in the real world by a predetermined multiple as the travel distance in virtual space.

In addition, the distance calculation unit 33 may perform weighting based on the safety of the vehicle travel in the real world. It should be noted that the frequency of sudden braking, or relationship between vehicle speed and the legal speed can be employed as the safety. In other words, it may be configured to perform weighting by multiplying a predetermined factor (less than 1) by the travel distance of the vehicle in the real world, in the case of the frequency of sudden braking being great, the case of the time for which the vehicle speed exceeds the legal speed being long, etc., and thus the safety being defined as low; while multiplying a specific factor (at least 1) by the travel distance of the vehicle in the real world, in the case of the frequency of sudden braking being low, the case of the time for which the vehicle speed exceeds the legal speed being short, etc., and thus the safety being defined as high.

The display control unit 34 displays a predetermined game screen according to the travel distance in virtual space calculated by the distance calculation unit 33 to the user via a display unit that is not illustrated. More specifically, the display control unit 34 displays a game screen of travelling on a route according to the travel distance in virtual space, as well as reading out an achievement card described later from the game data DB 42 when the travel distance in virtual space becomes a required distance set in advance, and displaying to the user. In addition, as described later, the display control unit 34 combines this achievement card and image data possessed by the user, and displays a composite image thus combined to the user.

The game data DB 42 stores predetermined game data used by the game device 1, as shown in FIG. 3. The game data includes data for the route in virtual space (more specifically, a stopping point constituting a route, an achievement card that can be acquired by reaching this stopping point, required distance that is necessary until this stopping point, etc.), for example. It should be noted that, although the route and stopping point can be set arbitrarily, since virtual travel is made for the user by the game device 1, it is preferable to define a sight-seeing area suited to the trip as a stopping point, and to set the route by linking a plurality of sight-seeing areas.

As one example, the route "Kanto" is a route starting from a stopping point "Kasai" and travelling to the stopping points "Nerima", "Tama", "Hachioji", "Ome" and "Okutama" (refer to FIG. 7), and is a route that can acquire an achievement card "radish (refer to FIG. 8)" when arriving at the stopping point "Nerima".

(System Configuration of Game System 50)

Next, one example of the system configuration realizing the game system 50 will be explained referring to FIG. 2.

Figure 2:
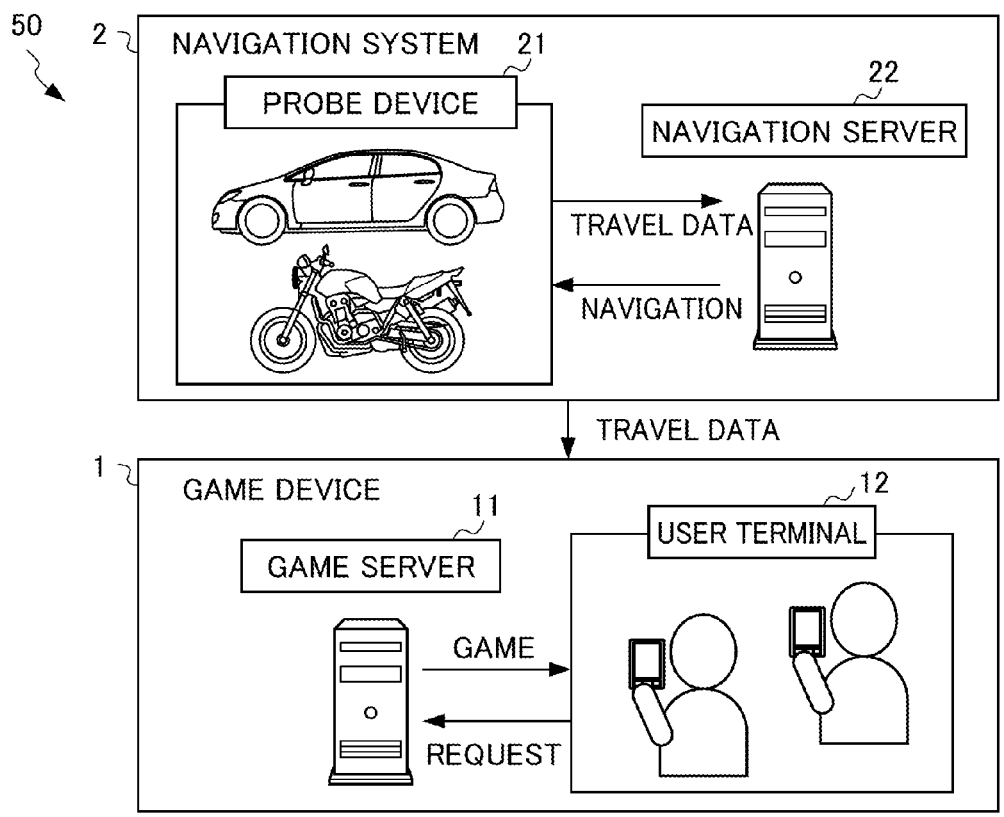
FIG. 2 is a view showing the system configuration of the game system.

As shown in FIG. 2, the probe device 21 is configured to include, a car navigation device built into a vehicle such as an automobile, a motorcycle or a bicycle, and a portable terminal (smart phone, etc.) to which an application for navigation has been installed. The probe device 21 is connected to be communicable with a navigation server 22 by way of a wireless communication function provided by this car navigation device, portable terminal, etc. It should be noted that the probe device 21 may be configured to include various sensors such as an acceleration sensor, and may collect travel data such as a flag for sudden braking from these sensors.

This probe device 21 constitutes a navigation server 22 as well as a navigation system 2. The navigation system 2 is an existing car navigation system that performs route guidance, etc. to the user of a vehicle.

The navigation server 22, when receiving data such as the current place of the vehicle, destination, etc. from the probe device 21, calculates an optimum trajectory to the destination upon considering traffic information, weather information, etc., and has a function of delivering to the probe device 21, whereby the navigation system 2 is realized by such a function.

The navigation system 2 manages the travel data of every vehicle, and transmits this travel data at the request of the game device 1 or periodically to the game device 1. It should be noted that, in the present embodiment, although it is configured so that the navigation server 22 performs the transmission of travel data to the game device 1, it is not limited thereto, and it may be configured so that the probe device 21 transmits travel data to the game device 1 directly.

For this reason, "acquiring travel data transmitted from the probe device 21" in the travel data acquisition unit 31 includes acquiring travel data indirectly from the probe device 21 via the navigation server 22, in addition to acquiring travel data directly from the probe device 21.

The game device 1 is configured to include a game server 11 and a user terminal 12. This game server 11 and user terminal 12 are connected to be communicable, and the game server 11 provides a game as requested from the user terminal 12.

A predetermined game program is installed to the game server 11 and user terminal 12, and the game server 11 and user terminal 12 come to have functions as the aforementioned travel data acquisition unit 31, route setting unit 32, distance calculation unit 33 and display control unit 34 according to this game program. It should be noted that the functions of the travel data acquisition unit 31 to display control unit 34 can be appropriately divided between the game server 11 and user terminal 12 as necessary. In this regard, in the present embodiment, it is configured so that the game server 11 has functions as the travel data acquisition unit 31 to display control unit 34, and the user terminal 12 has the function of the display control unit 34.

In addition, although the aforementioned user data DB 41 and game data DB 42 are provided to the game device 1, in the present embodiment, it is configured so that these databases (DB) are provided to the game server 11. Naturally, among the data stored in the user data DB 41 and game data DB 42, the data required in the user terminal 12 may be stored in the user terminal 12.

(Operation of Game System 50)

Figure 5:
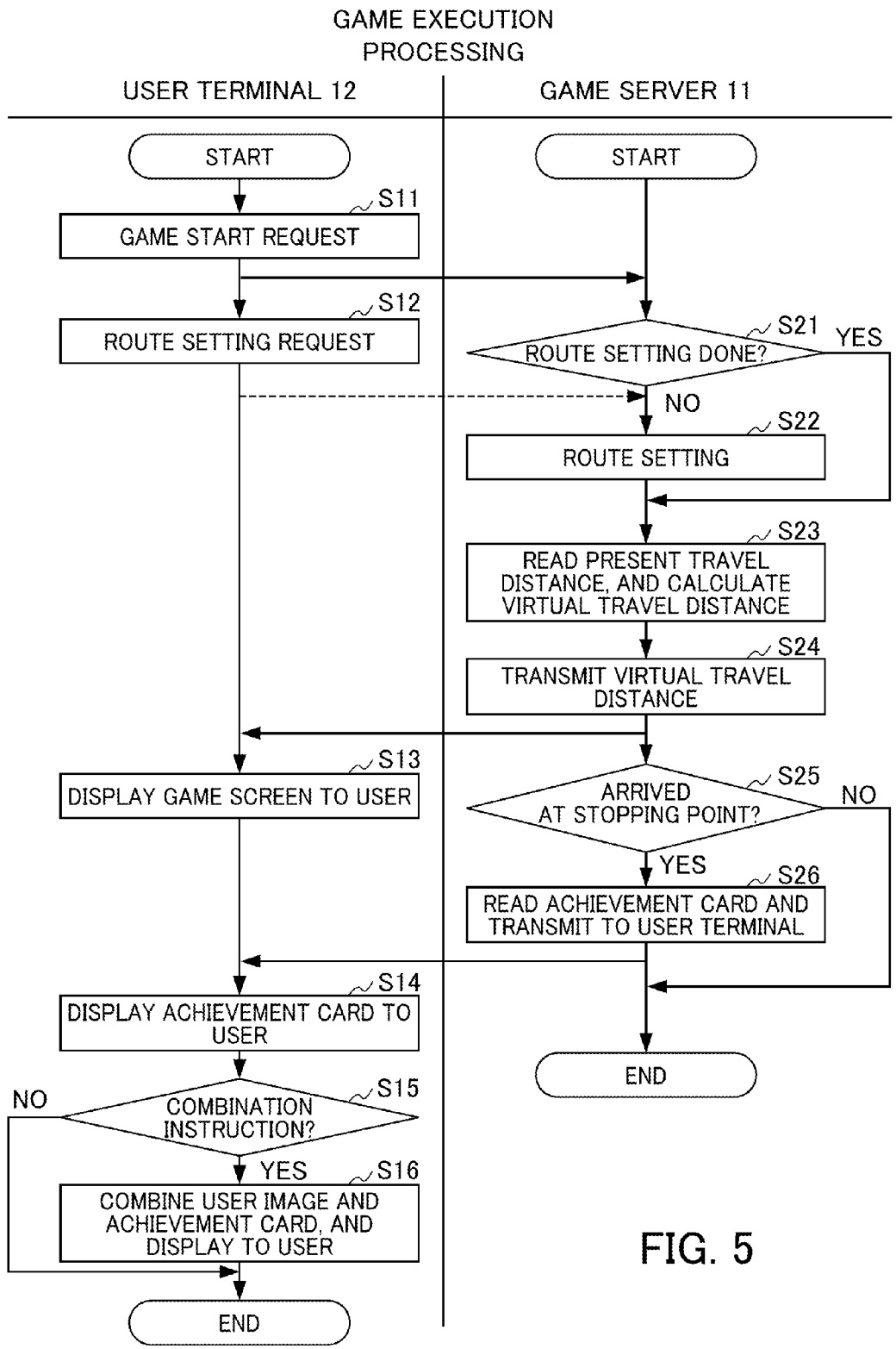
FIG. 5 is a flowchart showing the flow of processing of the game system.

The configuration of the game system 50 has been explained above. Next, operation of the game system 50 will be explained while referencing FIGS. 4 to 9. FIGS. 4 and 5 are flowcharts showing the flow of processing of the game system 50, and FIGS. 6 to 9 are display examples of a game screen displayed on the user terminal 12 accompanying this processing.

First, user information update processing will be explained while referencing FIG. 4.

In Step S1, the travel data acquisition unit 31 acquires travel data. In the present embodiment, the travel data acquisition unit 31 of the game server 11 accesses the navigation server 22, and acquires travel data corresponding to the game user. It should be noted that it may be configured so that the acquisition timing of travel data is carried out at an arbitrary timing, for example, acquired cyclically, and it may be configured so as to acquire according to the timing at which the user starts a game.

Continuing, in Step S2, the travel data acquisition unit 31 stores the acquired travel data in the user data DB 41 to be associated with every user, and ends the processing.

Next, game execution processing will be explained while referencing FIG. 5.

In Step S11, a game application is activated in the user terminal 12, and a game start request (login request) is transmitted from the user terminal 12 to the game server 11 according to the input of ID and password from the user.

When receiving the game start request, the route setting unit 32 of the game server 11 determines whether the logged in user is already setting a route in Step S21. It should be noted that, as mentioned above, it may be configured so that the travel data acquisition unit 31 of the game server 11 acquires travel data corresponding to the user from the navigation server 22 at the timing at which the game start request was received.

Continuing, in the case of being a user not setting a route yet, the route setting unit 32 sets a route for the user (Step S22) by accepting a route setting request from the user (Step S12).

Figure 6:
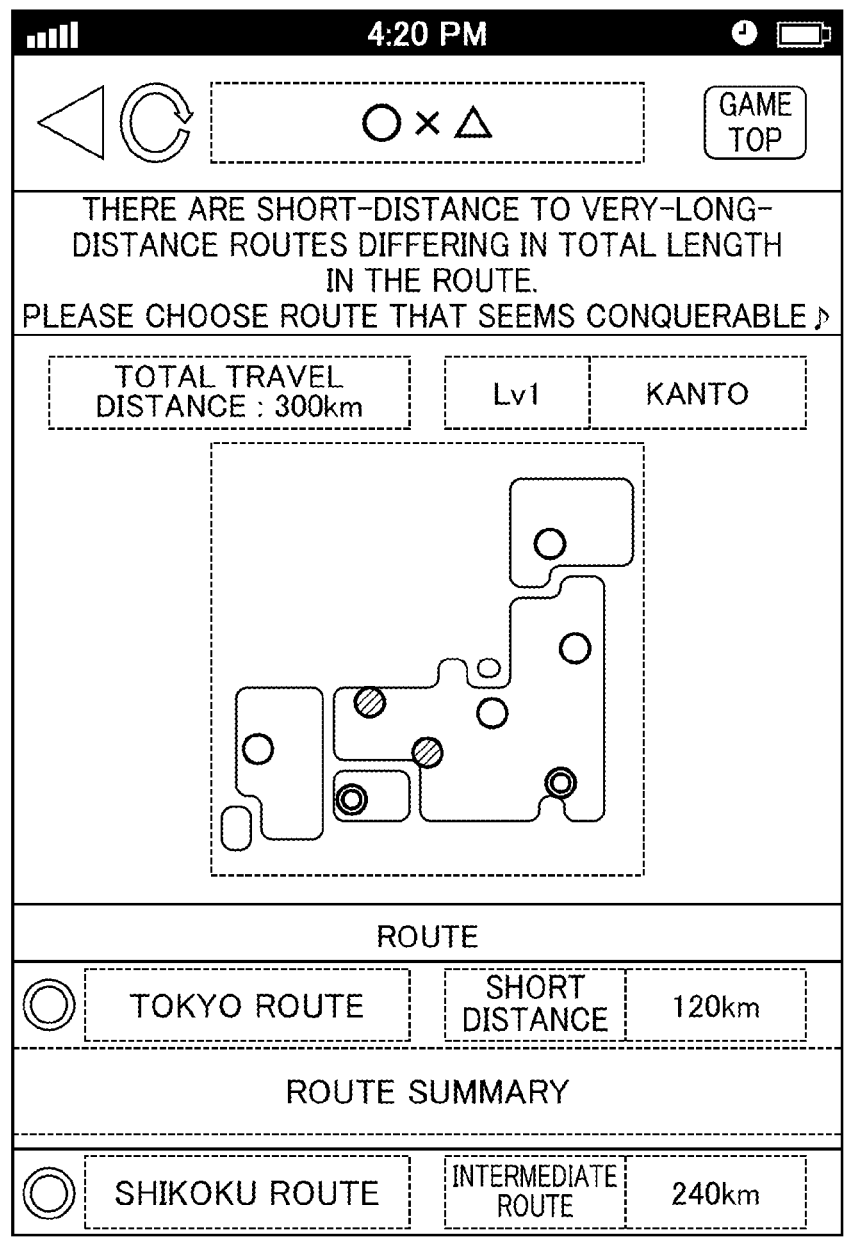
FIG. 6 is a view showing a display example of a game screen displayed on a user terminal.

In this regard, one example of a route selection screen displayed on the user terminal 12 is shown in FIG. 6. The route forms a travel route in which the point of departure, stopping points and the destination are established, and a plurality of routes is prepared in advance. In FIG. 6, a plurality of routes set all over Japan is shown. The method of selecting a route from among this plurality of routes, in addition to selecting from a map like that shown in FIG. 6, may be selecting by displaying a list indicating the plurality of routes in a pull-down format.

It should be noted that these routes can be set arbitrarily due to being virtual travel routes, and it may be configured so as to set various places in another country as routes, not necessarily all over Japan like that shown in FIG. 6, and may be configured so as to set routes such as a round-the-world trip. In addition, it may be configured so as to set a route that is difficult in reality like submarine travel or interstellar travel.

Referring back to FIG. 5, when the logged in user sets the route, the distance calculation unit 33 of the game server 11 reads the present travel distance corresponding to the user in the user data DB 41, and calculates the travel distance in virtual space, in Step S23. Herein, the distance calculation unit 33 basically calculates the present travel distance as the travel distance in virtual space as is; however, it may be configured so as to calculate the travel distance in virtual space upon performing predetermined weighting on the present travel distance as mentioned above.

Continuing, when the distance calculation unit 33 of the game server 11 transmits the travel distance in virtual space calculated to the user terminal 12 (Step S24), the display control unit 34 of the user terminal 12 displays a game screen travelling on the route set based on the travel distance in virtual space to the user (Step S13).

Figure 7:
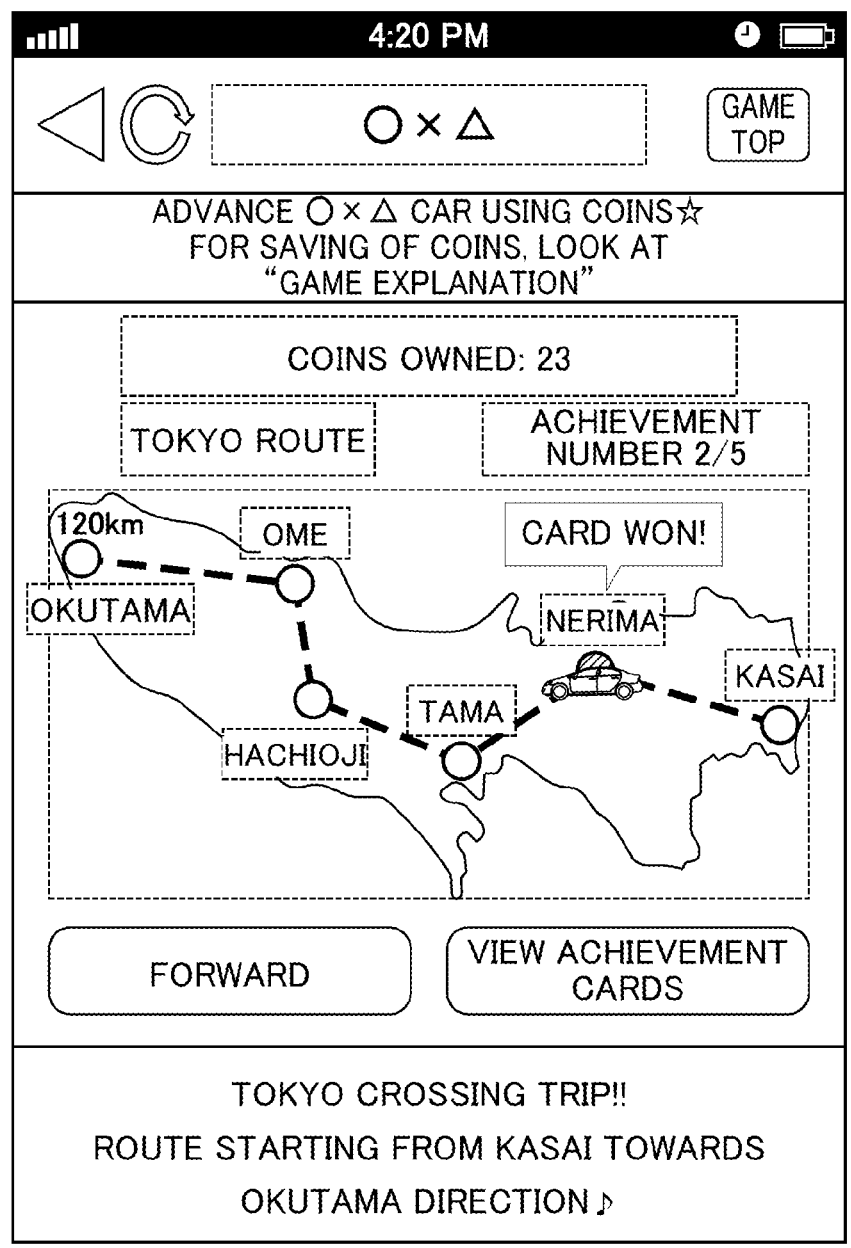
FIG. 7 is a view showing a display example of a game screen displayed on a user terminal.

Herein, one example of a game screen displayed on the user terminal 12 is shown in FIG. 7. FIG. 7 shows a game screen travelling a Tokyo route. In the Tokyo route, the user comes to perform a virtual trip from "Kasai" to "Okutama". In FIG. 7, since the travel distance in virtual space calculated based on the travel distance in the real world reached the required distance from "Kasai" to "Nerima", it is shown that the user arrived in "Nerima".

Referring back to FIG. 5, the distance calculation unit 33 of the game server 11 determines whether the travel distance in virtual space calculated in Step S24 has reached the required distance set to the next stopping point in Step S25. At this time, it is determined as having reached a stopping point in the case of the travel distance in virtual space reaching the required distance, and the display control unit 34 of the game server 11 reads the achievement card corresponding to this stopping point from the game data DB 42 and transmits to the user terminal 12 (Step S26). Then, the display control unit 34 of the user terminal 12 having received the achievement card from the game server 11 displays the received achievement card to the user (Step S14).

On the other hand, it is determined as not having reached a stopping point yet in the case of the travel distance in virtual space not reaching the required distance, and the processing is ended.

Figure 8:
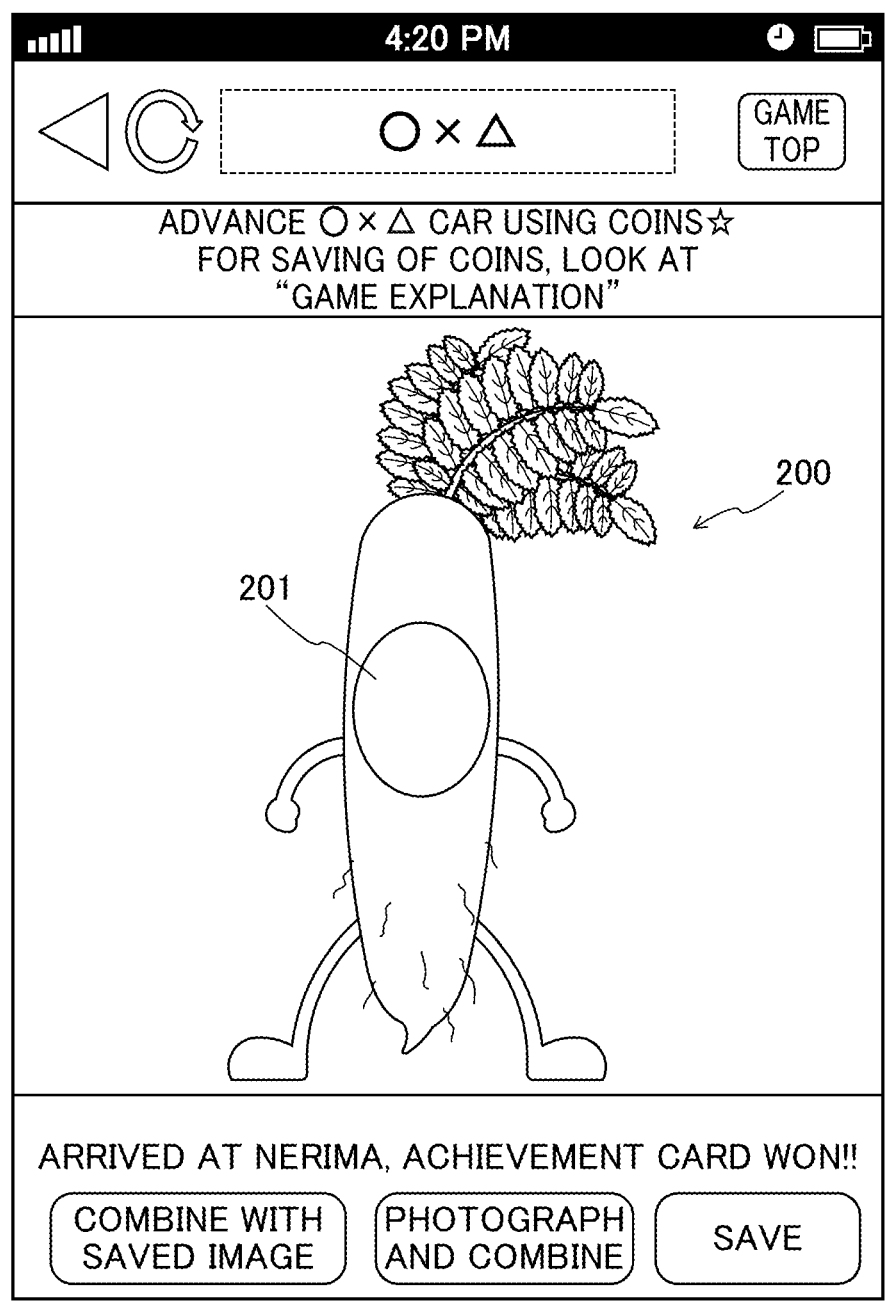
FIG. 8 is a view showing a display example of a game screen displayed on a user terminal.

Herein, with the game screen shown in FIG. 7, the matter of having reached the stopping point "Nerima" is shown, and the matter of achieving an achievement card is shown. Therefore, one example of an achievement card achieved at the stopping point "Nerima" is shown in FIG. 8.

The achievement card is an image of something originating from the area like a local character, buildings such as shrines and temples, specialty products such as produce and confectionery, and notable public figures, and a part thereof is hollowed out. In FIG. 8, an achievement card of a radish character 200 originating from the stopping point "Nerima" is displayed on the user terminal 12. For this radish character 200, a hollowed-out portion 201 is formed in a central portion thereof. In the hollowed-out portion 201, it is possible to insert an image set by the user as described later.

It should be noted that the image of the achievement card once achieved by the user is saved in the user terminal 12 or game server 11 in a state that can be browsed and used anytime by the user.

Referring back to FIG. 5, the display control unit 34 of the user terminal 12 determines whether there was a combination instruction when displaying the achievement card to the user (Step S15). At this time, in the case of there being a combination instruction, the display control unit 34 combines the user image and the achievement card, and displays the combined composite image to the user (Step S16). On the other hand, in the case of there not being a combination instruction, the processing is ended.

Figure 9:
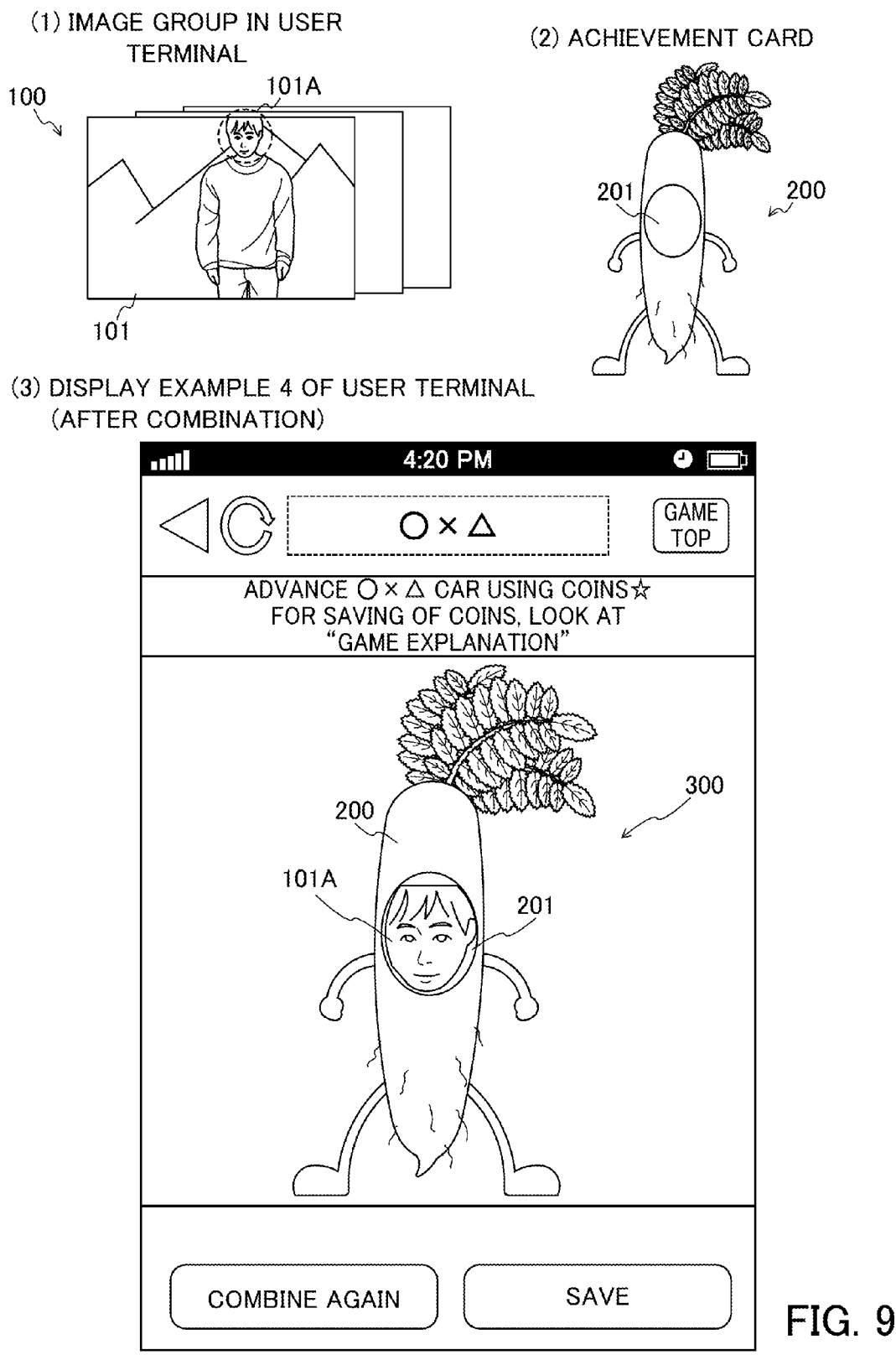
FIG. 9 is a view showing a display example of a game screen displayed on a user terminal.

Herein, one example of a combination of a user image and an achievement card is shown in FIG. 9. In the achievement card, a part thereof is hollowed out, and it is possible to combine a user image in this hollowed-out portion. As the user image to be combined, in addition to an image already saved in the user terminal 12, it is possible to use a photograph, etc. captured by a camera function of the user terminal 12.

In FIG. 9, an image 101 of an image group 100 saved in the user terminal 12 and the radish character 200 are combined. More specifically, as shown in FIG. 9, the selection of the image 101 to be combined from among the image group 100 is accepted at the user terminal 12. When the image 101 is selected, the display control unit 34 specifies a face portion 101A of a human from among the image 101. It should be noted that specification of the face portion 101A can be performed arbitrarily, and it may be configured so as to accept a selection from the user, and may be configured so as to automatically specify according to predetermined analysis.

When specifying the face portion 101A, the display control unit 34 inserts the face portion 101A into the hollowed-out portion 201 of the radish character 200 shown in FIG. 9 to combine the image 101 and the radish character 200. As a result thereof, a composite image 300 shown in FIG. 9 comes to be displayed to the user.

Second Embodiment

The game system 50 of the first embodiment has been explained in the foregoing. Next, a game system 50A of a second embodiment will be explained while referencing FIG. 10. With the game system 50 of the first embodiment, it is configured so as to prepare achievement cards to provide to the user accompanying arrival at a stopping point on a manager side in advance; however, with the game system 50A of the second embodiment, it is made possible to set the achievement card in response to a contribution from the user.

It should be noted that, for the configurations that are the same as the first embodiment in the following, the same reference symbols will be assigned, and explanations thereof will be omitted.

Figure 10:
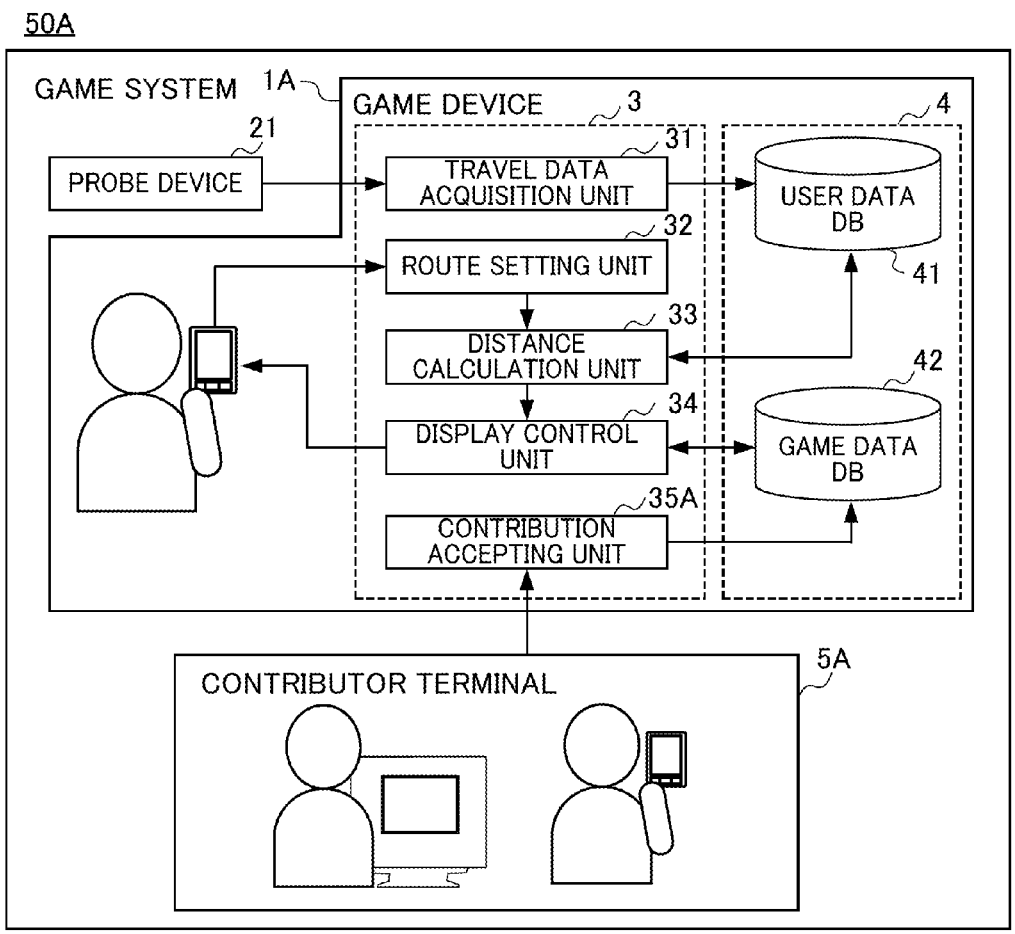
FIG. 10 is a block diagram showing the functional configuration of a game system of a second embodiment.

As shown in FIG. 10, the game system 50A of the second embodiment includes a contributor device 5A in addition to a game device 1A and the probe device 21. The contributor device 5A is connected to be communicable with the game device 1A (game server 11), and is used by a user contributing an achievement card. It should be noted that the user contributing an achievement card and the game user of the game device 1A may be the same user, and may be different users. The user contributing an achievement card prepares image data of the achievement card based on a format established in advance, and contributes to the game device 1A (game server 11) by designating a registered stopping point.

In order to accept a contribution of an achievement card from the contributor device 5A, a contribution accepting unit 35A is provided to the game device 1A (game server 11). This contribution accepting unit 35A is a function exhibited by the control unit 3 in accordance with a predetermined game program, and when accepting a contribution of an achievement card and designation of a stopping point from the contributor device 5A, stores the contributed achievement card in the game data DB 42 to be associated with the designated stopping point.

According to such a configuration of the second embodiment, a plurality of achievement cards becomes settable relative to one stopping point. Herein, in the case of the user having reached a stopping point for which a plurality of achievement cards is set, it may be configured so as to provide one achievement card selected by the user from among the plurality of achievement cards, and may be configured so as to provide one achievement card randomly from among the plurality of achievement cards.

In addition, it can be made a configuration that accepts evaluation of achievement cards, and it may be configured so as to raise the contribution urge of achievement cards by publishing a highly evaluated achievement card and the user having contributed the highly evaluated achievement card and providing virtual currency (points) to the user. In addition, in a case of allowing a user to select an achievement card, it may be configured so as to also publish the number of times selected for every achievement card.

The following such effects are exerted according to the game systems 50 and 50A explained in the foregoing.

(1) With the game system 50 of the above embodiment, the control unit 3 of the game device 1, when acquiring travel data including the travel distance for which the vehicle of the user travelled in the real world, calculates the travel distance in virtual space based on this travel data, and travels (advances trip) in virtual space by the calculated amount. Then, if reaching a set stopping point (sight-seeing area) as a result of this travel (trip advancement), the control unit 3 of the game device 1 displays to the user sight-seeing area information set according to the reached stopping point (sight-seeing area).

It is thereby possible to provide a game in which elements of the real world are introduced to the user of a vehicle such as an automobile. In particular, since it is made a configuration that uses the travel distance in the real world, irrespective of the presence of route guidance, it is possible to make the game advance using all of the vehicle travel time, and travel of the vehicle is not entirely wasted.

(2) In addition, the sight-seeing area information is an image unique to a sight-seeing area, and the control unit 3 of the game device 1 displays to the user a composite image produced by combining a sight-seeing area unique image and an image set by the user. It is thereby possible for the user to have a feeling of making a realistic trip accompanying advancement of the game.

In addition, the control unit 3 of the game device 1A is configured to accept a contribution of a sight-seeing area unique image from the user. It is thereby possible to establish the images provided to the user rich in variation.

Although preferred embodiments of the present invention have been explained in the foregoing, the present invention is not to be limited to the aforementioned embodiments, and modifications are possible as appropriate.

What is claimed is:

1. A game system comprising: a probe device that collects and transmits travel data including a travel distance and at least one of a vehicle speed and a flag for sudden braking from a vehicle of a user; and a game device that is communicably connected with the probe device,
wherein the game device comprises:
a travel data acquisition unit that acquires the travel data of the user from the probe device;
a distance calculation unit that calculates a safety of vehicle travel weighting factor based on at least one of the vehicle speed and the flag for sudden braking included in the travel data of the user acquired by the travel data acquisition unit, and, after calculating the safety of vehicle travel weighting factor, calculates a travel distance in virtual space as a function of: the travel distance acquired with the travel data by the travel data acquisition unit; and the safety of vehicle travel weighting factor; and
a display control unit that displays, to the user, sight-seeing area information that is set in advance according to the travel distance in virtual space calculated by the distance calculation unit.

2. The game system according to claim 1, wherein the game device further comprises a route setting unit that sets a route in virtual space travelled based on the travel distance in virtual space,
wherein the sight-seeing area information is an image unique to a sight-seeing area existing on the route set by the route setting unit, and
wherein the display control unit displays, to the user, a composite image produced by combining the image unique to the sight-seeing area and an image selected by the user from among images possessed by the user.

3. The game system according to claim 1, wherein, after calculating the safety of vehicle travel weighting factor, the distance calculation unit calculates the travel distance in virtual space by multiplying the travel distance of the travel data acquired by the travel data acquisition unit and the safety of vehicle travel weighting factor.

4. The game system according to claim 3, wherein the game device further comprises a route setting unit that sets a route in virtual space travelled based on the travel distance in virtual space,
wherein the display control unit displays, to the user, sight-seeing area information that is set in advance for a sight-seeing area existing on the route set by the route setting unit as the travel distance in virtual space calculated by the distance calculation unit increases so that the travel distance in the virtual space reaches, from a beginning of the route set by the route setting unit, the sight-seeing area existing on the route set by the route setting unit.

5. The game system according to claim 3, wherein the game device further comprises a route setting unit that sets a route in virtual space travelled based on the travel distance in virtual space,
wherein the sight-seeing area information is an image unique to a sight-seeing area existing on the route set by the route setting unit, and
wherein the display control unit displays the image unique to the sight-seeing area existing on the route set by the route setting unit as the sight-seeing area is reached on the route set by the route setting unit as the travel distance in virtual space calculated by the distance calculation unit increases so that the travel distance in the virtual space reaches, from a beginning of the route set by the route setting unit, the sight-seeing area existing on the route set by the route setting unit.

6. The game system according to claim 1, wherein the game device further comprises a route setting unit that sets a route in virtual space travelled based on the travel distance in virtual space,
wherein the display control unit displays, to the user, sight-seeing area information that is set in advance for a sight-seeing area existing on the route set by the route setting unit as the travel distance in virtual space calculated by the distance calculation unit increases so that the travel distance in the virtual space reaches, from a beginning of the route set by the route setting unit, the sight-seeing area existing on the route set by the route setting unit.

7. The game system according to claim 1, wherein the game device further comprises a route setting unit that sets a route in virtual space travelled based on the travel distance in virtual space, wherein the sight-seeing area information is an image unique to a sight-seeing area existing on the route set by the route setting unit, and wherein the display control unit displays the image unique to the sight-seeing area existing on the route set by the route setting unit as the sight-seeing area is reached on the route set by the route setting unit as the travel distance in virtual space calculated by the distance calculation unit increases so that the travel distance in the virtual space reaches, from a beginning of the route set by the route setting unit, the sight-seeing area existing on the route set by the route setting unit.

8. A game system comprising: a probe device that collects and transmits travel data including a travel distance and at least one of a vehicle speed and a flag for sudden braking from a vehicle of a user; and a game device that is communicably connected with the probe device, wherein the game device comprises:

a travel data acquisition unit that acquires the travel data of the user from the probe device;

a distance calculation unit that calculates a safety of vehicle travel weighting factor based on at least one of the vehicle speed and the flag for sudden braking included in the travel data of the user acquired by the travel data acquisition unit, and, after calculating the safety of vehicle travel weighting factor, calculates a travel distance in virtual space based on the travel data acquired by the travel data acquisition unit and the safety of vehicle travel weighting factor;

a route setting unit that sets a route in virtual space travelled based on the travel distance in virtual space; and a display control unit that displays, to the user, sight-seeing area information that is set in advance according to the travel distance in virtual space calculated by the distance calculation unit, wherein the sight-seeing area information is an image unique to a sight-seeing area existing on the route set by the route setting unit, wherein the display control unit displays, to the user, a composite image produced by combining the image unique to the sight-seeing area and an image selected by the user from among images possessed by the user, and wherein the game device further comprises a contribution accepting unit that receives a contribution of the image unique to the sight-seeing area which is uploaded by a user who contributes to the game device, and stores, for selection by the display control unit as the image unique to the sight-seeing area, a predetermined image unique to a sight-seeing area and the image unique to the sight-seeing area contributed by the user who contributes to the game device.

\* \* \* \* \*